June 3, 1941.   A. GÜNTHERSCHULZE   2,243,902
GAS FILLED ELECTRON TUBE
Filed March 15, 1940
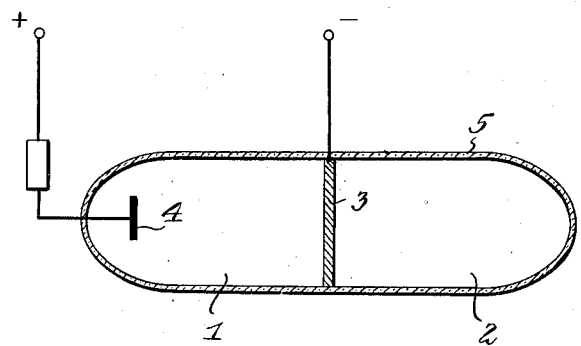
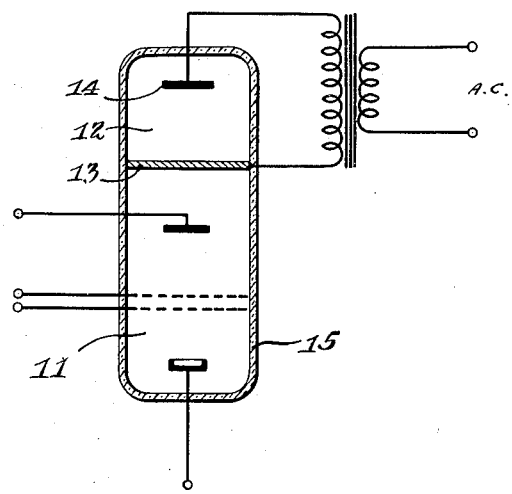
INVENTOR
AUGUST GÜNTHERSCHULZE
BY
ATTORNEY Patented June 3, 1941

2,243,902

UNITED STATES PATENT OFFICE 2,243,902

GAS FILLED ELECTRON TUBE

August Güntherschulze, Dresden, Germany, assignor to Patentverwertungs-Gesellschaft mit beschränkter Haftung "Hermes," Berlin, Germany, a corporation of Germany Application March 15, 1940, Serial No. 324,044
In Germany February 3, 1939

4 Claims. (Cl. 250—27.5)

The invention relates to electron tubes, and especially to tubes which operate with a gas filling in order to decrease the space charge.

An object of the invention is to provide means for maintaining the gas pressure constant inside of a gas-filled discharge device.

Other objects and advantages of the invention will be apparent from the following description and drawing in which:

Fig. 1 is a diagrammatic illustration of the general principle of the invention;

Fig. 2 is a view in cross-section of an embodiment of the invention.

The great difficulty with gas filling tubes is that the gas pressure does not always remain constant at the necessarily low value for which the operation of these tubes is originally designed. It has been found that there will be an occasional clean-up of the gas inside of the tube because of an absorption by the various interior parts of the device, especially the glass walls.

When the tube has been designed to control the operation of a machine upon the occurrence of a certain condition, the change in gas pressure may cause the tube to fail to respond when this specific condition requires the operation of the tube.

The invention especially contemplates means for supplying gas to the discharge path of the tube so that the tube will always be maintained with the desired gas pressure.

The basis for the invention is disclosed in Fig. 1 in which 1 and 2 are two vacuum-tight closed spaces which are separated by the partition 3. The thickness and porosity of the partition are so proportioned that a diffusion of gases does not occur under normal conditions. A very thin iron plate is suitable for this partition of a thickness of the order of 0.1 mm. In space 1, there is also an electrode 4. A vacuum-tight glass envelope 5 encloses the entire arrangement. In space 1 there is a gas, for example, hydrogen, of 1 mm. of mercury pressure. In space 2, on the contrary, there is a high vacuum where the pressure is less than $10^{-6}$ mm. of mercury pressure. This condition remains practically unchanged for a long time if the tube is not operated. If a glow discharge is started in space 1, perferably with the iron plate 3 as a cathode and the electrode 4 as an anode, then the gas pressure drops in space 1 while it begins to rise in space 2. Residual amounts of gas can thus be pumped from space 1 to space 2. The phenomenon depends on the fact that the gas particles in the glow discharge as ions, are shot against the iron plate with considerable energy. The shot-in gas particles exert a high pressure under whose action the gas particles diffuse to the other compartment, whereby at least a part of the gas particles reach space 2.

In Fig. 2, there is illustrated a practical embodiment of the invention. In space 12, there is the electrode 14, which is utilized in bombarding the preferably iron plate 13. In space 11 is illustrated the electrode structure of the desired elements of the low pressure gas discharge electrodes. This may comprise an electrode suitable for an anode, another suitable for a cathode, and one or more control electrodes, as desired. The shape and number of these electrodes can be varied accordingly to the operation desired therefor.

It may be desired to have in space 11 a constant low pressure of gas which would, for example, be only $10^{-3}$ mm. of hydrogen. A first amount of gas may be constantly consumed through gas absorption proportional to the time the tube is in operation. The glow discharge in space 12 may be connected at the same time as the gas discharge electrodes of the amplifier or other purpose tube, so that the same amount of gas absorbed or cleaned up is pumped from the space 12 through the thin partition 13 to the space 11. The gas pressure in space 12 is preferably chosen, for example, of 10 mm. of mercury in the largest possible volume so that the amounts of gas used up are relatively small and the proportions in the discharge path of space 11 remain practically unchanged during a long period.

The determination of the amounts of gas pumped into space 11 per unit of time is obtained by the suitable choice of the partition 13, and also by the correct selection of current and voltage of the glow discharge impinging thereon. It is possible to operate the glow discharge in the space 12 at the same time as the other glow discharge, or it may be performed at stated intervals, depending upon the utilization of discharge in space 11.

The glow discharge may be operated with alternating voltage so that the partition is the cathode only during a half wave. The operation as an anode in the other half wave has no harmful influence. The expense of making a connection for this discharge is very small, as the so-called "leakage transformer" is appropriately used as a transformer.

Although a specific embodiment of the present invention has been shown and described, it is not desired to be limited thereto as various other modifications of the same may be made without departing from the spirit and scope of the appended claims.

What is claimed:

1. A discharge device comprising a vacuum-tight container, a metallic partition, permeable to gas when bombarded by gaseous ions, in said container dividing said container into compartments, a gaseous medium reservoir in the first compartment, an anode, cathode and gaseous medium in said second compartment, said partition normally maintaining the gaseous mediums of said compartments separate from each other, and an electrode within said first compartment for cooperating to direct a discharge against said metallic partition for replenishing the gaseous medium in said second compartment from said first compartment.

2. A discharge device comprising a vacuum-tight container, a thin metal partition, permeable to gas when bombarded by gaseous ions, dividing said container into two separate compartments, a gaseous medium at a higher pressure in one compartment than in the other compartment, said partition normally maintaining the gaseous mediums of said compartments separate from each other, an electrode in said compartment of higher pressure for forming a discharge directed at said metal partition whereby gas is pumped therethrough to the other compartment, and an anode and cathode in the gaseous medium in the other compartment.

3. A discharge device comprising a vacuum-tight container, a thin iron partition, permeable to gas when bombarded by gaseous ions, separating said container into two closed compartments, a gaseous atmosphere in each of the compartments, an electrode in the first compartment for cooperating with said partition to direct a discharge against said partition whereby gaseous medium may be passed from one compartment to the other, and an anode and cathode in the gaseous medium of the second compartment.

4. A discharge device comprising a vacuum-tight container, a thin iron partition, permeable to gas when bombarded by gaseous ions separating said container into two closed compartments, a hydrogen gaseous medium in the first compartment, an electrode in said first compartment for cooperating to direct a discharge against the partition whereby hydrogen is pumped into the other compartment, and an anode, cathode and gaseous medium in the other compartment.

AUGUST GÜNTHERSCHULZE.